US 6,563,240 B2
May 13, 2003

(12) United States Patent
Lin et al.

(10) Patent No.: US 6,563,240 B2
(45) Date of Patent: May 13, 2003

(54) ELECTRIC MOTOR HAVING A RAIN BAFFLE

(75) Inventors: Chih Min Lin, Tipp City, OH (US); Ronald D. Hirth, Troy, OH (US)

(73) Assignee: A. O. Smith Corporation, Milwaukee, WI (US)

( * ) Notice: Subject to any disclaimer, the term of this patent is extended or adjusted under 35 U.S.C. 154(b) by 0 days.

(21) Appl. No.: 09/841,450

(22) Filed: Apr. 24, 2001

(65) Prior Publication Data

US 2002/0153788 A1 Oct. 24, 2002

(51) Int. Cl.[7] .............................. H02K 9/02; H02K 9/04
(52) U.S. Cl. ............................... 310/58; 310/62; 310/89; 310/60 R
(58) Field of Search .......................... 310/58, 59, 62, 310/89, 60 R

(56) References Cited

U.S. PATENT DOCUMENTS

| 2,114,907 A | * | 4/1938 | Oesterlein ..................... 310/57 |
| 2,726,343 A | | 12/1955 | Stiglmeier et al. |
| 3,094,272 A | * | 6/1963 | McClure ........................ 310/63 |
| 3,143,897 A | * | 8/1964 | Kohn ............................ 310/83 |
| 3,243,617 A | * | 3/1966 | Cunningham ................. 310/63 |
| 3,250,926 A | * | 5/1966 | O'Reilly et al. ............... 310/59 |
| 3,731,126 A | | 5/1973 | Hagenlocher et al. |
| 3,766,453 A | | 10/1973 | Schenk et al. |
| 4,275,321 A | * | 6/1981 | Shimamoto et al. .......... 310/59 |
| 4,766,337 A | * | 8/1988 | Parkinson et al. ............ 310/58 |
| 5,243,244 A | | 9/1993 | Kasberger et al. |
| 5,307,702 A | | 5/1994 | Spellman et al. |
| 5,563,461 A | | 10/1996 | Daniels |
| 5,929,544 A | | 7/1999 | Mackawa et al. |

\* cited by examiner

Primary Examiner—Burton S. Mullins
(74) Attorney, Agent, or Firm—Michael Best & Friedrich LLP

(57) ABSTRACT

An electric motor having a rain baffle which is supported relative to and within the motor housing to prevent rain or the like which may enter ventilation outlets in the housing from contacting the rotor shaft bearing and the electrical components positioned within the housing. The rain baffle is also supported relative to and within the motor housing to allow air used to cool the motor to pass around the perimeter of the baffle and out the ventilation outlets in such a way as to substantially minimize the exhaust air from being recirculated back into air inlet vents in the housing.

31 Claims, 3 Drawing Sheets

ELECTRIC MOTOR HAVING A RAIN BAFFLE

FIELD OF THE INVENTION

The present invention relates generally to electric motors incorporating an internal baffle to protect components housed within the motor from exposure to rain, sleet, snow or other contaminants which may enter the motor through ventilation openings.

BACKGROUND OF THE INVENTION

Many electrical motors for outdoor applications require internal baffles to inhibit water or other contaminants, which may enter openings or vents that allow cooling air to travel through the motor, from contacting the rotor, electrical windings or other electrical components housed within the motors. It is generally known to provide a funnel shaped baffle within a motor housing near air outlet vents in the housing. If water or some other contaminant enters through the outlet vents, the baffle prevents the water or other contaminants from reaching the electrical components, particularly the rotor and electrical windings.

As generally understood, thermal protection of an electric motor is nearly as important as the amount of power produced by the motor. In other words, if a motor is not sufficiently cooled during operation, the motor could overheat, thereby possibly damaging the motor. Illustrated in FIG. 3 is a known electric motor 10 including a housing 12 having therein an inlet vent 14 and an outlet vent 26. A funnel shaped baffle 34, which is press-fit into the housing, is positioned near the outlet vent 26 to inhibit water or other contaminants which may enter through the outlet vent 26 from reaching the internal electrical components, such as the stator winding 18 and rotor 22, of the motor 10. The motor draws cooling air in (representatively shown as arrow A) through the inlet vent 14 and guides the air (representatively shown as arrows B and C) through the motor 10 to cool internal components. The air passes through the baffle 34 (as shown by arrow D), prior to exiting the outlet vent 26. The motor also includes an end frame 38 and a rotor shaft bearing 46.

SUMMARY OF THE INVENTION

As can be appreciated, it is desirable for the temperature of the intake air to be less than the temperature of the exhaust air. A problem with the known funnel baffle 34 design shown in FIG. 3 is that it sometimes causes hot exhaust air to be recirculated back into the air inlet vent 14, thereby reducing the cooling efficiency of the motor. As shown in FIG. 3, as the heated air passes through the baffle 34, the air undergoes a change of flow direction, typically an abrupt 180° turn (see arrow D in FIG. 3), prior to exiting the outlet vent 26. The sudden change in the direction of air flow results in a pressure loss which reduces the total amount of air flow. Another disadvantage of the sudden change in the direction of air flow is that the abrupt 180° turn directs the hot air exiting the outlet vent 26 back into the inlet vent 14 (see arrow E in FIG. 3).

Another problem with the known funnel baffle 34 design is that it does not always adequately shield the rotor shaft bearing 46 (FIG. 3) from exposure to water and other contaminants. This can reduce the operating life of the bearing 46.

Another problem with the known baffle design concerns its manner of assembly. A press machine is needed to mount the baffle 34 within the motor housing 12. This adds undesirable labor costs to the overall assembly of the motor.

Accordingly, there is a need for a new electric motor baffle design which addresses the above noted problems and other problems. A feature of the present invention is to provide an electric motor having a baffle which is supported relative to and within the motor housing, so that the baffle not only substantially prevents water and other contaminants which may enter an outlet vent in the motor housing from contacting certain internal components of the motor, it also allows air passing through the motor housing to exit the outlet vent without first having to radically change flow directions just prior to exiting the outlet vent. The streamlined air flow minimizes pressure loss in the hot exhaust air, so as to reduce the likelihood of the hot exhaust air from being recirculated back into an inlet vent in the motor housing. This greatly increases the cooling efficiency of the motor to better ensure that the motor will not overheat during operation, especially if the motor is operating under full load conditions or producing its maximum power. Another benefit of increasing the cooling efficiency of the motor may result in modifying material specifications for the motor, which may translate into reduced material costs, thereby increasing profitability of the overall motor design.

Another feature of the present invention is to provide an electric motor having a baffle which is supported relative to and within a housing for the motor, such that the baffle is spaced a distance away from an inner surface of the housing to allow air entering an inlet vent in the motor housing to travel around the baffle, as opposed to through the baffle, and out an outlet vent without having to substantially change its direction of flow prior to exiting the outlet vent.

Another feature of the present invention is to provide an electric motor having a baffle which is supported relative to and within a housing for the motor so as to protect a rotor shaft bearing from exposure to water and other contaminants which may enter the motor housing through an air outlet vent. According to one aspect of the invention, the motor includes an end frame which is mounted to the housing and which supports the bearing. The baffle abuts the end frame, and is preferably mounted directly to the end frame, to effectively shield the bearing from exposure to water and other contaminants.

Another feature of the present invention is to provide an electric motor having a baffle which is supported relative to and within the housing without having to use a press machine, thereby reducing labor costs associated with assembling the motor.

In a preferred embodiment, the baffle according to the present invention includes a first ring shaped portion, a second portion forming a part of a frustum extending from the first portion, and a third portion forming a part of a cylinder extending from the second portion. Preferably, when the baffle is mounted to an end frame within a motor housing, the third portion axially overlaps a stator winding and rotor within the housing to substantially prevent water and other contaminants which may enter an outlet vent in the housing from contacting the stator winding and rotor.

Other features and advantages of the invention will become apparent to those skilled in the art upon review of the following detailed description, claims and drawings in which like numerals are used to designate like features.

Figure 1:
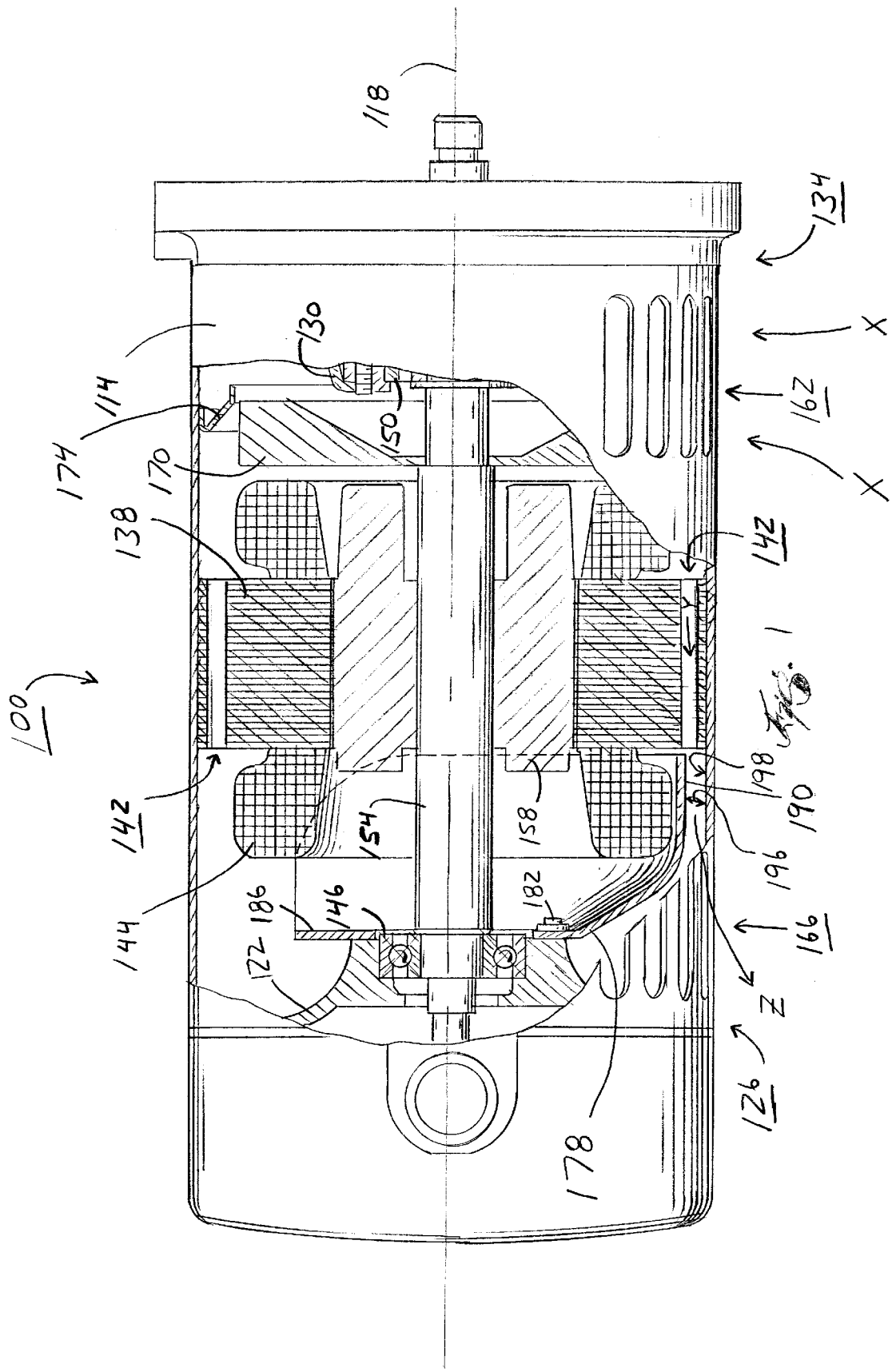
FIG. 1 is a side elevational view, partially in section, of an electric motor embodying the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use of "including" and "comprising" and variations thereof herein is meant to encompass the items listed thereafter and equivalents thereof as well as additional items and equivalents thereof.

DESCRIPTION OF THE PREFERRED EMBODIMENT

Illustrated in FIG. 1 is an electric motor 100 embodying the invention. It should be understood that the present invention is capable of use in other electric motors and the electric motor 100 is merely shown and described as an example of one such motor.

The motor 100 comprises a housing 114 having an axis 118. The motor 100 also includes an end frame 122 mounted on one end 126 of the housing 114 and a second end frame 130 mounted on an opposite end 134 of the housing 114. Although not clearly illustrated in FIG. 1, the end frames 122 and 130 may be separate from the housing 114, or the housing 114 and the end frames 122 and 130 could be unitary. The motor 100 also comprises a stator core 138 supported by the housing 114 and fixed relative to the end frames 122 and 130. The stator 138 includes a plurality of vent holes 142 which allow air to pass there through for cooling the motor, particularly the electrical windings 144 of the stator 138. A bearing 146 is supported by the end frame 122. Although not clearly shown in FIG. 1, a second bearing 150 is supported by the end frame 130. A rotor shaft 154 is supported by the bearings 146 and 150 for rotation about the axis 118. A rotor 158 is supported by the shaft 154 for rotation therewith relative to the stator 138.

With continued reference to FIG. 1, the housing 114 includes air inlet vents 162 near end 134 and adjacent end frame 130, and air outlet vents 166 near end 126 and adjacent end frame 122. Although a plurality of vents 162 and 166 are shown, one or more vents may be provided. In general, motors adapted for outside use are typically mounted to a structure so as to lie in a horizontal plane, as representatively shown in FIG. 1. For this reason and to best protect the internal components of the motor from exposure to water and other contaminants, the vents 162 and 166 are located in the bottom half of the housing 114. A fan 170 is conventionally, operatively coupled to the shaft 154 and an inlet baffle 174 is mounted within the housing 114 adjacent the inlet vents 162. FIG. 1 further illustrates baffle 178 which is supported relative to and within the housing 114 as will be further described below.

Figure 3:
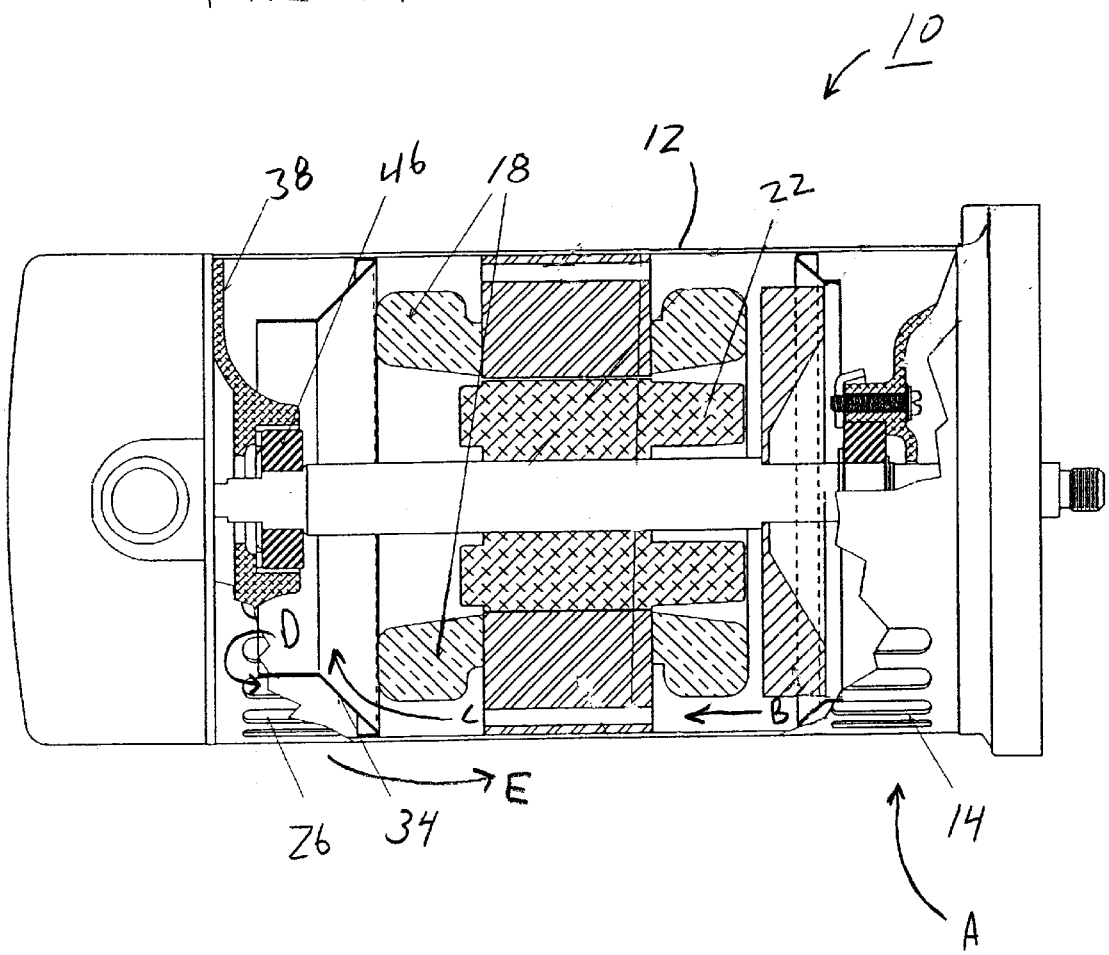
FIG. 3 is a side elevational view, partially in section, of a prior known electric motor design.

As can be appreciated, cooling air (representatively shown as arrows X in FIG. 1) enters the motor 100 through the inlet vents 162. The cooling air is guided by the end frame 130 and inlet baffle 174 so as pass through the fan 170. The cooling air then passes through the vent holes 142 in the stator 138 (representatively shown as arrow Y in FIG. 1). In the prior known motor 10 design of FIG. 3, the heated air would then pass through the funnel shaped baffle 34 and reach the adjacent end frame 38. As explained, in the prior known motor 10 design, the hot air would then be forced to make a 180° turn between the funnel shaped baffle 34 and the adjacent end frame 38 prior to exiting the outlet vents 26 provided in the housing 12. As explained, this abrupt change in the direction of air flow in the prior design produces a large pressure drop, such that the total amount of air flow is reduced and a significant portion of the hot exhaust air exiting the outlet vents 26 may be drawn or directed into the inlet vents 14, thereby greatly reducing the cooling efficiency of the motor 10. Unlike this prior known motor 10 design, after the cooling air passes through the vent holes 142 in the stator 138 of the motor 100 according to the present invention, the heated air passes around, as compared to through, the baffle 178 and is simply guided out of the outlet vents 166 (as representatively shown by arrow Z in FIG. 1). A feature of the present invention is that the air does not undergo a sudden change in flow direction prior to exiting through the outlet vents 166. As a result, there is no significant pressure loss and the hot exhaust air flows away from, rather than back to, the intake vents 162, thereby increasing the cooling efficiency of the motor.

Figure 2:
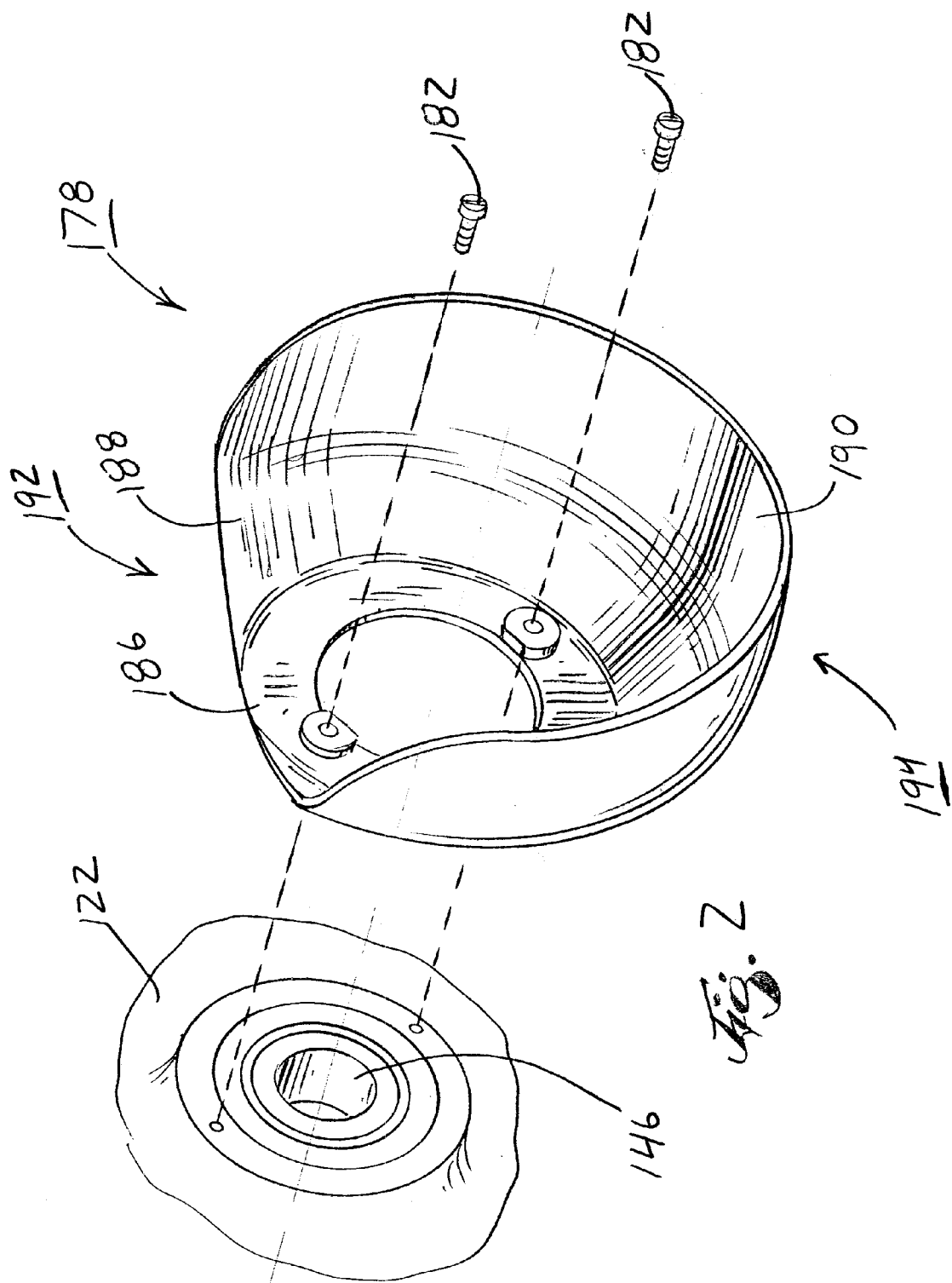
FIG. 2 is an exploded perspective view illustrating a portion of the end frame, the rotor shaft bearing and the baffle of the electric motor shown in FIG. 1.

FIG. 2 illustrates a preferred construction of the baffle 178. The baffle 178 abuts the end frame 122, and is preferably mounted directly to the end frame 122 with screws 182 (see also FIG. 1). A press machine is not needed to mount the baffle 178 within the housing 114, as is the case with the prior known baffle 34 design shown in FIG. 3. So mounted, the baffle 178 prevents rain and other external contaminants from reaching the rotor shaft bearing 146 (see also FIG. 1), thereby increasing the potential operating life and reliability of the bearing 146. The baffle 178 includes a first ring shaped portion 186 which abuts end frame 122 (see also FIG. 1), a second portion 188 forming a part of a frustum and extending from the first portion 186, and a third portion 190 forming a part of a cylinder and extending from the second portion 188. As shown, the second portion 188 and the third portion 190 are not completely closed so as to define an open side 192 and a closed side 194. Because the motor 100 is usually placed horizontally to the ground (see FIG. 1), the closed side 194 of the baffle 178 is positioned adjacent the outlet vents 166 to prevent water and other contaminants bouncing off of the ground or otherwise entering the vents 166 from reaching the vital components housed within the motor 100. Since vents are typically not provided in the top half of the housing 114, the baffle 178 does not need to be completely closed, hence the reason for the open side 192. Even so, the baffle 178 may be closed if desired.

Referring again to FIG. 1, it can be observed that the baffle 178, particularly the third portion 190, is spaced a minimum distance 196 away from the inner surface 198 of the housing 114. In a preferred arrangement, the spacing 196 is approximately the same size as the vent holes 142 in the stator 138. As should be apparent, the spacing 196 between the baffle 178 and the housing 114 allows air entering the inlet vents 162 to pass through the housing 114 without being redirected around the baffle 178 before exiting the outlet vents 166, thereby minimizing pressure loss in the flow of air before the flow of air reaches the outlet vents 166. This generally linear flow of air through the motor 100 helps ensure that the hot exhaust air is directed away from the inlet vents 162 for the reasons previously explained. As can also be observed in FIG. 1, the baffle 178, particularly the third portion 190, axially overlaps at least a portion of the stator winding 144 and rotor 158 to prevent rain and other external contaminants which may enter the outlet vents 166 from contacting the stator winding and rotor 158.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. An electric motor having an axis, said electric motor comprising:
   a housing;
   an air vent in said housing;
   an end frame mounted on said housing;
   a stator supported by said housing;
   a shaft supported by said end frame for rotation about the axis;
   a rotor supported by said shaft for rotation therewith relative to said stator; and
   a baffle having a first end abutting said end frame and a second free end, said second free end positioned substantially within said housing;
   wherein said air vent is an outlet vent, and wherein said housing also includes an air inlet vent, said outlet vent and said inlet vent being located at opposite ends of said housing, such that said baffle allows air entering said inlet vent to pass through said housing without redirecting around said baffle before exiting said outlet vent.

2. An electric motor according to claim 1, wherein said baffle is mounted directly to said end frame.

3. An electric motor according to claim 1, wherein said baffle is mounted directly to said end frame with at least one screw.

4. An electric motor according to claim 1, wherein said air vent is an outlet vent which is adjacent said end frame.

5. An electric motor according to claim 1, further comprising a bearing which is supported by said end frame and which supports said shaft, and wherein said baffle is supported relative to said housing so as to substantially prevent water and other contaminants which may enter said air vent from reaching said bearing.

6. An electric motor according to claim 1, wherein said baffle axially overlaps said stator to substantially prevent water and other contaminants which may enter said air vent from contacting said stator.

7. An electric motor having an axis, said electric motor comprising:
   a housing;
   an air vent in said housing;
   an end frame mounted on said housing;
   a stator supported by said housing;
   a shaft supported by said end frame for rotation about the axis;
   a rotor supported by said shaft for rotation therewith relative to said stator; and
   a baffle having a first end abutting said end frame and a second free end, said second free end positioned substantially within said housing;
   wherein said baffle includes a first ring shaped portion which abuts said end frame, a second portion forming a part of a frustum and extending from said first portion, and a third portion forming a part of a cylinder and extending from said second portion.

8. An electric motor according to claim 7, wherein said second portion and said third portion are not completely closed, thereby defining an open side and a closed side of said baffle, such that said closed side is adjacent to said air vent.

9. An electric motor according to claim 7, wherein said air vent is an outlet vent, and wherein said housing also includes an air inlet vent, said outlet vent and said inlet vent being located at opposite ends of said housing, such that said baffle allows air entering said inlet vent to pass through said housing without redirecting around said baffle before exiting said outlet vent.

10. An electric motor having an axis, said electric motor comprising:
    a housing;
    an air vent in said housing;
    a bearing supported by said housing;
    a stator supported by said housing;
    a shaft supported by said bearing for rotation about the axis;
    a rotor supported by said shaft for rotation therewith relative to said stator; and
    a baffle supported relative to and within said housing, said baffle being asymmetric with respect to the motor axis, said baffle substantially preventing water and other contaminants which may enter said air vent from reaching said bearing.

11. An electric motor according to claim 10, further comprising an end frame mounted on said housing, wherein said bearing is supported by said end frame, and wherein said baffle is mounted directly to said end frame.

12. An electric motor according to claim 10, further comprising an end frame mounted on said housing, wherein said air vent is an outlet vent which is adjacent said end frame.

13. An electric motor according to claim 10, wherein said baffle includes a first ring shaped portion which abuts said end frame, a second portion forming a part of a frustum and extending from said first portion, and a third portion forming a part of a cylinder and extending from said second portion.

14. An electric motor according to claim 13, wherein said second portion and said third portion are not completely closed, thereby defining an open side and a closed side of said baffle, such that said closed side is adjacent to said air vent.

15. An electric motor according to claim 10, wherein said baffle axially overlaps said stator to substantially prevent water and other contaminants which may enter said air vent from contacting said stator.

16. An electric motor according to claim 10, wherein said air vent is an outlet vent, and wherein said housing also includes an air inlet vent, said outlet vent and said inlet vent being located at opposite ends of said housing, such that said baffle allows air entering said inlet vent to pass through said housing without redirecting around said baffle before exiting said outlet vent.

17. An electric motor having an axis, said electric motor comprising:
- a housing;
- an air vent in said housing;
- a stator supported by said housing;
- a shaft supported by said housing for rotation about the axis;
- a rotor supported by said shaft for rotation therewith relative to said stator; and
- a baffle having a fixed end and a free end and supported relative to and within said housing, such that said baffle axially overlaps said stator to substantially prevent water and other contaminants which may enter said air vent from contacting said stator, said baffle being asymmetric with respect to said motor axis.

18. An electric motor according to claim 17, further comprising an end frame mounted on said housing, and a bearing which is supported by said end frame and which supports said shaft, wherein said baffle is mounted directly to said end frame.

19. An electric motor according to claim 17, further comprising an end frame mounted on said housing, wherein said air vent is an outlet vent which is adjacent said end frame.

20. An electric motor according to claim 17, wherein said baffle includes a first ring shaped portion which abuts said end frame, a second portion forming a part of a frustum and extending from said first portion, and a third portion forming a part of a cylinder and extending from said second portion.

21. An electric motor according to claim 20, wherein said second portion and said third portion are not completely closed, thereby defining an open side and a closed side of said baffle, such that said closed side is adjacent to said air vent.

22. An electric motor according to claim 17, wherein said air vent is an outlet vent, and wherein said housing also includes an air inlet vent, said outlet vent and said inlet vent being located at opposite ends of said housing, such that said baffle allows air entering said inlet vent to pass through said housing without redirecting around said baffle before exiting said outlet vent.

23. An electric motor according to claim 17, wherein said baffle axially overlaps said rotor.

24. An electric motor having an axis, said electric motor comprising:
- a housing having opposite ends;
- an air inlet vent located at one end of said housing;
- an air outlet vent located at the other end of said housing;
- a stator supported by said housing;
- a shaft supported by said housing for rotation about said axis;
- a rotor supported by said shaft for rotation therewith relative to said stator; and
- a baffle having a fixed end and a free end, said fixed end connected to said housing to support the baffle, said free end disposed adjacent said stator and substantially within said housing, such that said baffle substantially prevents water and other contaminants which may enter said air outlet vent from contacting components of said motor, and such that said baffle allows air entering said air inlet vent to pass through said housing without redirecting around said baffle before exiting said outlet vent.

25. An electric motor according to claim 24, further comprising an end frame mounted on said housing, and a bearing which is supported by said end frame and which supports said shaft, wherein said baffle is mounted directly to said end frame.

26. An electric motor according to claim 24, further comprising an end frame mounted on said housing, wherein said baffle includes a first ring shaped portion which abuts said end frame, a second portion forming a part of a frustum and extending from said first portion, and a third portion forming a part of a cylinder and extending from said second portion.

27. An electric motor according to claim 26, wherein said second portion and said third portion are not completely closed, thereby defining an open side and a closed side of said baffle, such that said closed side is adjacent to said outlet vent.

28. An electric motor having an axis, said electric motor comprising:
- a housing having opposite ends;
- an air inlet vent located at one end of said housing;
- an air outlet vent located at the opposite end of said housing;
- an end frame mounted on said housing;
- a bearing supported by said end frame;
- a stator supported by said housing;
- a shaft supported by said bearing for rotation about the axis;
- a rotor supported by said shaft for rotation therewith relative to said stator; and
- a baffle mounted to said end frame within said housing to substantially prevent water and other contaminants which may enter said outlet vent from reaching said bearing, said baffle including a first ring shaped portion which abuts said end frame, a second portion forming a part of a frustum extending from said first portion, and a third portion forming a part of a cylinder extending from said second portion such that said third portion axially overlaps said stator to substantially prevent water and other contaminants which may enter said outlet vent from contacting said stator, said baffle being spaced a distance away from an inner surface of said housing to allow air entering said inlet vent to pass through said housing without redirecting around said baffle before exiting said outlet vent, thereby substantially minimizing pressure loss and preventing the air exiting said outlet vent from being recirculated back in to said inlet vent.

29. An electric motor according to claim 28, wherein said second portion and said third portion are not completely closed, thereby defining an open side and a closed side of said baffle, such that said closed side is adjacent to said outlet vent.

30. An electric motor according to claim 28, wherein said baffle axially overlaps a winding of said stator.

31. An electric motor according to claim 28, wherein said baffle axially overlaps said rotor.

* * * * *